No. 889,889. PATENTED JUNE 9, 1908.
J. E. BARRETT.
POWER TRANSMISSION DEVICE.
APPLICATION FILED AUG. 28, 1907.
2 SHEETS—SHEET 1.
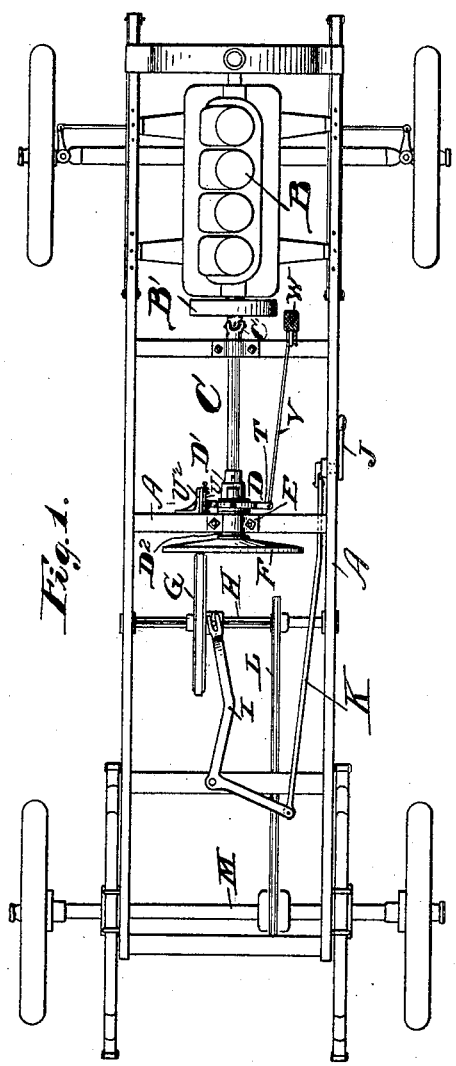
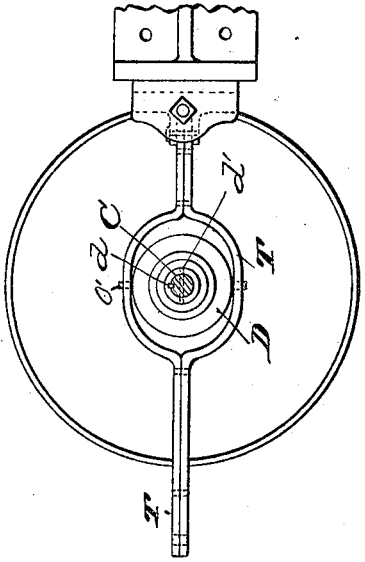
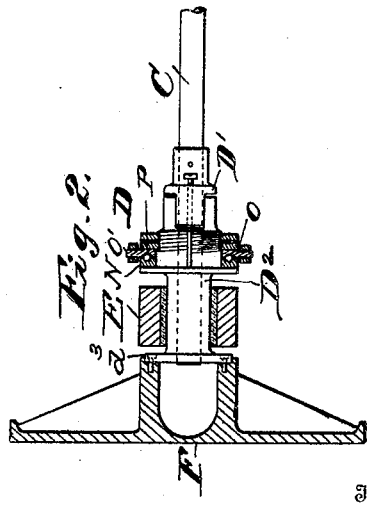
Witnesses
Grace E. Wynkoop.
Vina E. Mertz.
Inventor
Joseph E. Barrett.
By S. E. Thomas
Attorney

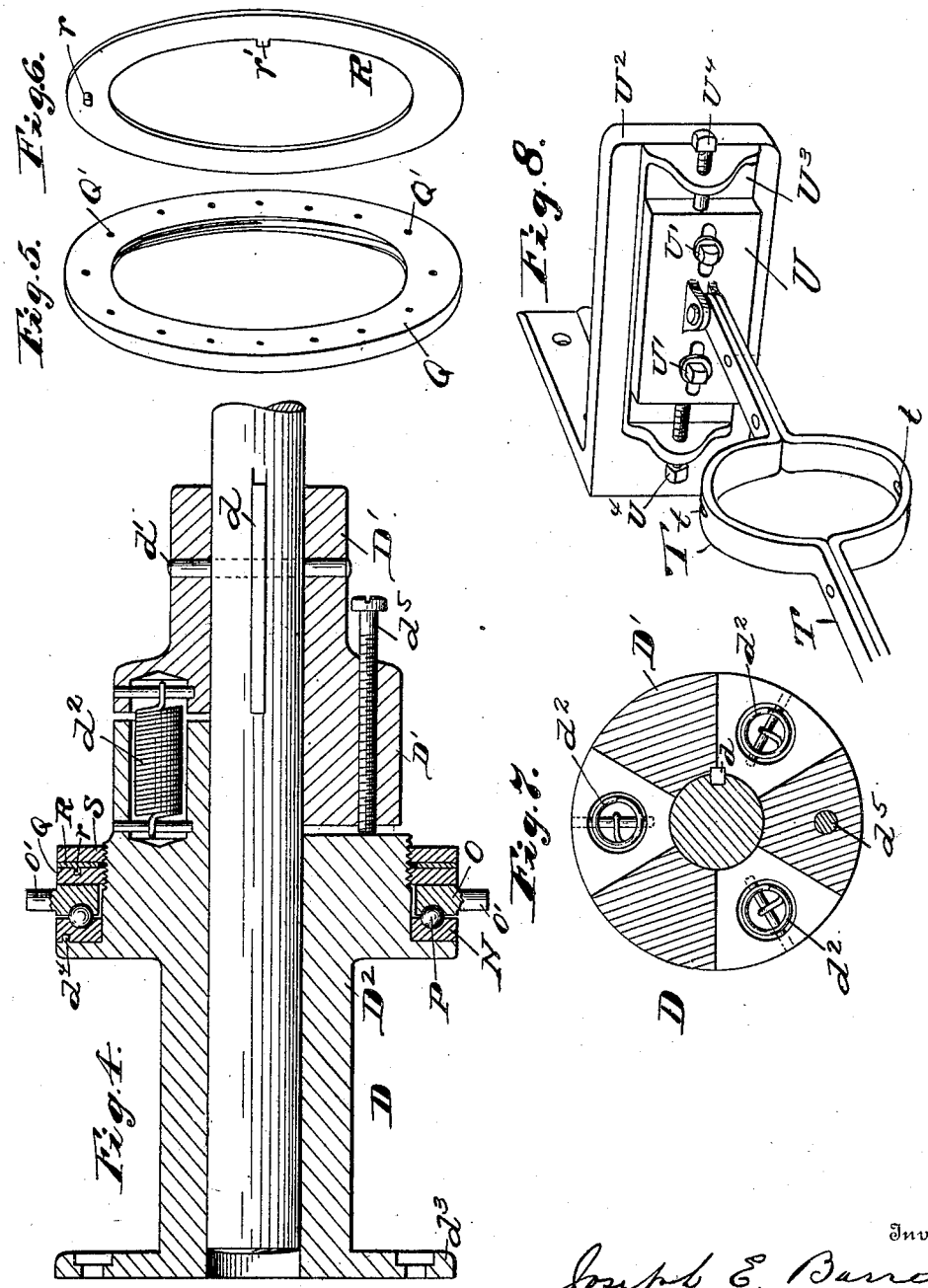

UNITED STATES PATENT OFFICE.

JOSEPH E. BARRETT, OF DETROIT, MICHIGAN, ASSIGNOR OF ONE-THIRD TO HARRY J. FERRELL AND ONE-THIRD TO JOHN H. CONNOR, BOTH OF DETROIT, MICHIGAN.

POWER-TRANSMISSION DEVICE.

No. 889,889.　　　　　Specification of Letters Patent.　　　　Patented June 9, 1908.

Application filed August 28, 1907. Serial No. 390,483.

*To all whom it may concern:*

Be it known that I, JOSEPH E. BARRETT, citizen of the United States, residing at Detroit, county of Wayne, State of Michigan, have invented a certain new and useful Improvement in Power-Transmission Devices, and declare the following to be a full, clear, and exact description of the same, such as will enable others skilled in the art to which it pertains to make and use the same, reference being had to the accompanying drawings, which form a part of this specification.

My invention relates to an improvement in friction drive power transmission devices for automobiles shown in the accompanying drawings and more particularly pointed out in the following specification and claims.

The object of my invention is an improvement in the general construction and arrangement of the parts having particularly in view means whereby the friction disk is operated by mechanism located adjacent thereto, thereby avoiding the movement of a long drive shaft with its connecting parts as in constructions now in general use.

Another object is to do away with all parts that are likely to soon wear, become loose and rattle, an objection raised to other forms of this type of power transmission now on the market.

Other advantages and improvements will hereafter appear.

Referring now to the drawings forming part of this specification: Figure 1 is a plan view of the frame work showing the running gear in position. Fig. 2 is a sectional view through the friction disk and its bearing, showing the coupling mechanism in elevation with the means for operating the clutch in section. Fig. 3 is an elevation of the friction disk showing the lever for operating the coupling mechanism. Fig. 4 is a longitudinal section enlarged through the coupling mechanism mounted on the drive shaft. Fig. 5 is a perspective view of the ring nut employed to secure the ball-cones of the coupling mechanism in position. Fig. 6 is a perspective view enlarged of the washer used in conjunction with ring shown in Fig. 5 to secure the latter against rotation when adjusted. Fig. 7 is a cross-sectional view enlarged through the drive shaft and one member of the coupling mechanism. Fig. 8 is a perspective view showing the bracket and the adjustable block to which is pivoted the lever for operating the coupling mechanism.

In the drawings: A indicates the frame of the machine, B the engines, B′ its fly-wheel, C is the drive shaft and C′ a universal joint located on the drive shaft.

D is a two part segmental coupling mechanism, the part D′ is keyed to the shaft as indicated at $d$ and is further secured by means of the pin $d'$. The part $D^2$ is mounted in a suitable bearing E supported on the frame of the machine in which it also has a slight longitudinal movement.

F is a friction disk bolted to the outstanding flange $d^3$ of the part $D^2$.

G is a friction-wheel slidably mounted on the shaft H, being under control of the bell crank lever I connected to the foot lever J by means of the link K.

L is a drive chain connecting sprocket wheels mounted on the shaft H, and the drive axle M, as in the usual manner.

Referring again to the coupling mechanism D, the interlocking parts D′ and $D^2$ are of the three-part interlocking segmental type of construction, and are provided with a plurality of springs $d^2$ engaged to each part the action of which when not otherwise controlled is to draw the parts D′ and $D^2$ together, thereby removing the disk F from frictional contact with the wheel G.

N is one ring of a ball race sleeved on the part $D^2$ and held against rotation by the pin or stud $d^4$ in the part $D^2$.

O is the opposing ring of the ball race provided with projecting lugs $o'$ to engage an operating lever.

P indicates a plurality of balls housed between the rings N and O.

Q is a nut having a screw-threaded engagement with the part $D^2$ and when in place serves to hold the rings forming the ball race in position.

Q′ indicates a series of holes arranged concentrically in the nut Q, the purpose of which is to provide for the reception of the locking pin $r$ of the washer R, which is also provided with a tongue $r'$ designed to enter a suitable key-way provided for its reception in the part $D^2$.

S is a nut having a screw-threaded engagement with the part D² and serves to hold the washer R in place.

T is a lever looped around the ring O and provided with apertures *t* to receive the projecting lugs *o'* of the ring. The lever T is pivoted to the adjustable block U slotted to receive the bolts U' engaging it to the bracket U² secured to the frame of the machine.

U³ is a plate located back of the adjustable block U having end walls in which are mounted bolts U⁴ which serve to hold the block U against accidental displacement when properly adjusted to bear upon the block.

V is a link connecting the swinging end of the lever T with the operating foot lever W To provide for taking up the wear inevitable in the friction wheel G, the part D², to which is secured the friction disk F, is adjusted so as to be nearer the wheel G. This is readily accomplished by adjusting the set screw $d^5$ in the part D' so as to bear against the part D² and forcing the disk F nearer to the wheel G. A corresponding adjustment of the block U is then made to provide for a proper movement of the levers T and W.

Attention is particularly called to the fact that in this invention it is not necessary to give the drive shaft a longitudinal movement in order to bring the disk F into frictional contact with the wheel G as in many cars of this type. This construction requires only a slight movement of the disk F by means located adjacent to it to effect a driving contact with the wheel G;—it therefore overcomes the many objections urged against the construction just referred to.

Having thus indicated the several parts by reference letters the operation will be understood.

When it is desired to start the machine, the foot lever W is pressed which through the link V actuates the lever T engaging the part D² of the coupling mechanism D. The friction disk F being mounted on the end of the part D² is forced into driving contact with the friction wheel G on the shaft H on which is mounted a sprocket gear connected by the sprocket chain L with a similar gear on the drive axle M.

To change the speed or reverse the direction taken by the car, the friction wheel G is caused to slide along the shaft H with which it is keyed by means of the lever I operated by the foot lever J and connecting rod K as will be readily understood.

Having thus described my invention, what I claim is:

1. In an automobile, a motor, a drive shaft, a friction disk, a coupling on the drive shaft having a part movable longitudinally on said shaft, a universal joint between the motor and drive shaft, means for sliding the movable part of said coupling, a driven shaft, a slidable friction wheel on the driven shaft, and means for shifting said friction wheel with relation to said friction disk.

2. In an automobile, a motor, a drive shaft, a universal coupling between the drive shaft and motor, a friction disk, a coupling on the drive shaft having a longitudinally movable part, yieldable means for maintaining said coupling in one position, manually operated means for sliding the movable part of the coupling against said yieldable means, a driven shaft, a slidable friction wheel mounted on said driven shaft, and means for shifting said friction wheel with relation to said friction disk.

3. In an automobile, a motor, a drive shaft, a friction disk, a driven shaft, a slidable friction wheel mounted on the driven shaft, a two-part coupling mechanism, one part fixedly connected with the drive shaft, the other part slidable upon the drive shaft and connected directly with the friction disk, means for sliding the slidable part of the coupling to force the friction disk into driving contact with the friction wheel, and means for shifting the friction wheel on the driven shaft with respect to the friction disk.

4. In an automobile, a motor, a drive shaft, a friction disk, a driven shaft, a slidable friction wheel mounted on the driven shaft, a two-part coupling mechanism, one part fixedly connected with the drive shaft, the other part slidable upon the drive shaft and connected directly with the friction disk, means for sliding the slidable part of the coupling to force the friction disk into driving contact with the friction wheel, means for drawing the slidable part of the coupling into engagement with the other part thereof to separate the disk from the friction wheel when the operating means of the slidable part of the coupling is released, and means for shifting the friction wheel on the driven shaft with respect to the friction disk.

5. In an automobile, a motor, a drive shaft, a friction disk, a driven shaft, a sliding friction wheel mounted on the driven shaft, a two part coupling mechanism, one part fixedly connected with the drive shaft, the other adapted to slide upon the shaft and connected directly with the friction disk, means for sliding the slidable part of the coupling to force the friction disk into driving contact with the friction wheel, means consisting of a plurality of springs for drawing the slidable part of the coupling into engagement with the other part of the coupling to separate the disk from the friction wheel when the controlling means is released, and means for shifting the friction wheel on the driven shaft with respect to the friction disk.

6. In an automobile, a motor, a drive shaft, a friction disk, a driven shaft, a sliding friction wheel mounted on the driven shaft, a coupling, one interlocking part of which is fixedly connected with the drive shaft, the other connected directly to the friction disk and adapted to slide upon the drive shaft, means for sliding the slidable part of the coupling to force the friction disk into driving contact with the friction wheel and adjustable means to control the sliding travel of the coupling.

7. In an automobile, a motor, a drive shaft, a friction disk, a driven shaft, a sliding friction wheel mounted on the driven shaft, a coupling, one interlocking part of which is fixedly connected with the drive shaft, the other connected directly to the friction disk and adapted to slide upon the drive shaft, a lever for shifting the slidable part of the coupling to force the friction disk into driving contact with the friction wheel, means for adjusting the fulcrum end of said lever, and adjustable means to control the sliding travel of the coupling.

8. In an automobile, a motor, a drive shaft, a universal joint connection between the motor and the drive shaft, a driven shaft, a friction disk upon the drive shaft, a friction wheel upon the driven shaft, and means for adjusting the friction disk of the drive shaft independently of an adjustment of the drive shaft.

In testimony whereof, I sign this specification in the presence of two witnesses.

JOSEPH E. BARRETT.

Witnesses:
   GRACE E. WYNKOOP,
   SAMUEL E. THOMAS.